(12) United States Patent
Bindl (10) Patent No.: US 11,755,044 B2
(45) Date of Patent: Sep. 12, 2023

(54) METHOD AND SYSTEM FOR STORING ENERGY AND PROVIDING A REGULATED OUTPUT

(71) Applicant: Ronald Bindl, Glendale, AZ (US)

(72) Inventor: Ronald Bindl, Glendale, AZ (US)

(73) Assignee: Triad Pro Innovators, Inc., Phoenix, AZ (US)

( * ) Notice: Subject to any disclaimer, the term of this patent is extended or adjusted under 35 U.S.C. 154(b) by 29 days.

(21) Appl. No.: 17/221,628

(22) Filed: Apr. 2, 2021

(65) Prior Publication Data

US 2021/0296709 A1    Sep. 23, 2021

Related U.S. Application Data

(63) Continuation of application No. 16/162,233, filed on Oct. 16, 2018, now abandoned.

(60) Provisional application No. 62/572,700, filed on Oct. 16, 2017.

(51) Int. Cl.
| | |
|---|---|
| *H02J 7/00* | (2006.01) |
| *G05F 1/10* | (2006.01) |
| *H01M 10/44* | (2006.01) |
| *H02M 7/46* | (2006.01) |
| *H02J 7/34* | (2006.01) |

(52) U.S. Cl.
CPC ............ *G05F 1/10* (2013.01); *H01M 10/441* (2013.01); *H02J 7/0014* (2013.01); *H02J 7/345* (2013.01); *H02M 7/46* (2013.01)

(58) Field of Classification Search
USPC .................. 320/107, 108, 110, 118
See application file for complete search history.

(56) References Cited

U.S. PATENT DOCUMENTS

| | | | | |
|---|---|---|---|---|
| 6,211,684 | B1* | 4/2001 | McKee | H02H 7/16 361/287 |
| 2006/0087287 | A1* | 4/2006 | Thrap | H02J 7/0016 320/118 |
| 2008/0007891 | A1* | 1/2008 | Doljack | H01G 4/40 361/502 |
| 2012/0025769 | A1* | 2/2012 | Kikuchi | B60R 16/033 320/118 |
| 2012/0161708 | A1* | 6/2012 | Miura | B60L 58/14 903/903 |
| 2014/0327400 | A1* | 11/2014 | Kudo | B60L 50/51 320/118 |
| 2016/0261205 | A1* | 9/2016 | Kolar | H02M 1/32 |

(Continued)

*Primary Examiner* — Brian Ngo
(74) *Attorney, Agent, or Firm* — Plager Schack LLP; Mark H. Plager; Alexis J. Saenz (57) ABSTRACT

An energy storage system stores potential energy and providing a regulated output of electrical energy for powering an electrical load. The system includes an array of storage capacitors including a plurality of storage capacitors coupled in series. A balance control device balances the voltage on each of the storage capacitors in the array. An input control device manages the input for charging the storage capacitor array. An output power supply has an input coupled to the storage capacitor array and provides regulated power to an electrical load. A power monitor device electrically decouples the storage capacitor array from the electrical load when the total voltage of the storage capacitor array falls below a preset minimum level.

4 Claims, 5 Drawing Sheets

(56) References Cited

U.S. PATENT DOCUMENTS

2016/0373022 A1* 12/2016 Outram .................. H02M 1/36
2017/0085183 A1* 3/2017 Notsch ................... H02M 1/44
2019/0173393 A1* 6/2019 Chivite Zabalza ..... H02M 1/34

* cited by examiner

METHOD AND SYSTEM FOR STORING ENERGY AND PROVIDING A REGULATED OUTPUT

CROSS-REFERENCE TO RELATED APPLICATIONS

This application claims benefit under 35 U.S.C. § 119(e) of U.S. application Ser. No. 16/162,233 Filed on Oct. 16, 2018, which is hereby incorporated by reference herein in its entirety, which in turn claims the benefit of U.S. Provisional Patent Application Ser. No. 62/572,700 filed on Oct. 16, 2017, and the disclosure of which is incorporated herein in its entirety by this reference.

BACKGROUND

This invention relates to a method and system capable of accepting energy input generated by any type of energy source, and of storing such energy and providing a regulated output. More particularly, it relates to a method and system for storing potential energy from sources such as sun, wind, water, motion or thermal that can later be used to provide regulated AC or DC power until the system has been depleted.

Electronic energy storage media store energy that can be drawn upon at a later time to perform useful operations. All forms of energy are either potential energy (e.g., chemical, gravitational or electrical energy) or kinetic energy (e.g., thermal energy). A wind up clock stores potential energy (in this case mechanical, in the spring tension), a battery stores readily convertible chemical energy to keep a clock chip in a computer running (electrically) even when the computer is turned off, and a hydroelectric dam stores power in a reservoir as gravitational potential energy. Ice storage tanks store ice (thermal energy) at night to meet peak demand for cooling. Fossil fuels such as coal and gasoline store ancient energy from sunlight. Even food (which is made by the same process as fossil fuel) is a form of energy stored in chemical form.

Previously known systems that store energy using rechargeable battery technologies suffer from a number of major drawbacks. These include, for example, a relatively low rate of charging, a limited number of battery charge/discharge cycles, and toxic disposal issues after the battery's useable life cycle.

It is an object of the present invention to provide a method and system that can accommodate energy from all sources of input energy and can store that energy and provide a regulated output.

It is still another object of the present invention to provide a method and system that has an energy storage medium with virtually limitless cycles of charges and discharges.

It is yet another object of the present invention to provide a method and system for energy storage that is nontoxic to the environment.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification.

SUMMARY

To achieve the foregoing objects, and in accordance with the purposes of the invention as embodied and broadly described in this document, there is provided an energy storage system for storing potential energy and providing a regulated output of electrical energy for powering an electrical load. The system includes an array of storage capacitors that has a plurality of storage capacitors coupled in series. A balance control device is operative to balance a voltage on each of the storage capacitors in the array. An input control device is adapted to receive an electrical power source input and is operative to charge the array of storage capacitors. The input control device also is operative to isolate the power source input from the array of storage capacitors when the input voltage falls below a total voltage of the storage capacitor array and to isolate the power source input from the array of storage capacitors when the input voltage is above a maximum total voltage of the storage capacitor array. An output power supply has an input coupled to the storage capacitor array and operative to provide regulated power to an electrical load. A power monitor device is operative to electrically decouple the storage capacitor array from the electrical load when the total voltage of the storage capacitor array falls below a preset minimum level.

In some embodiments, the array of storage capacitors includes a plurality of capacitors coupled in parallel. In some embodiments, the output power supply can be configured to provide regulated DC output power at a voltage greater than the total voltage of the storage capacitor array. In other embodiments, the output power supply is configured to provide regulated DC output power at a voltage that is less than the total voltage of the storage capacitor array. In some embodiments, the output power supply is operative to convert DC power from the storage capacitor array to regulated AC output power.

BRIEF DESCRIPTION OF THE DRAWINGS

The accompanying drawings, which are incorporated in and constitute a part of the specification, illustrate the presently preferred embodiments and methods of the invention, and together with the general description given above and the detailed description of the preferred embodiments and methods given below, serve to explain the principles of the invention.

DESCRIPTION

Reference in this application is made to presently preferred embodiments of the invention. While the invention is described more fully with reference to these examples, the invention in its broader aspects is not limited to the specific details, representative devices, and illustrative examples shown and described. Rather, the description is to be understood as a broad, teaching disclosure directed to persons of ordinary skill in the appropriate arts, and not as limiting upon the invention.

An energy storage system according to the present invention can receive and store electric energy generated from any energy source—including solar, wind, water, motion, thermal, or the electric grid—and can provide that stored power in a regulated manner to an electric load or back to the electric grid. To achieve this, an input control and monitor subsystem insures the proper management of the input source. Once stored, the energy is available to an output regulator that will regulate the output current and voltage. The capacity of the storage unit is not limited in voltage, current, or to a particular energy source media and can be configured per application. The voltage of the storage unit can be greater or less than the output voltage of the output regulator, which can be configured to provide regulated AC or DC power to the electric load.

Overview of the System

Figure 1:
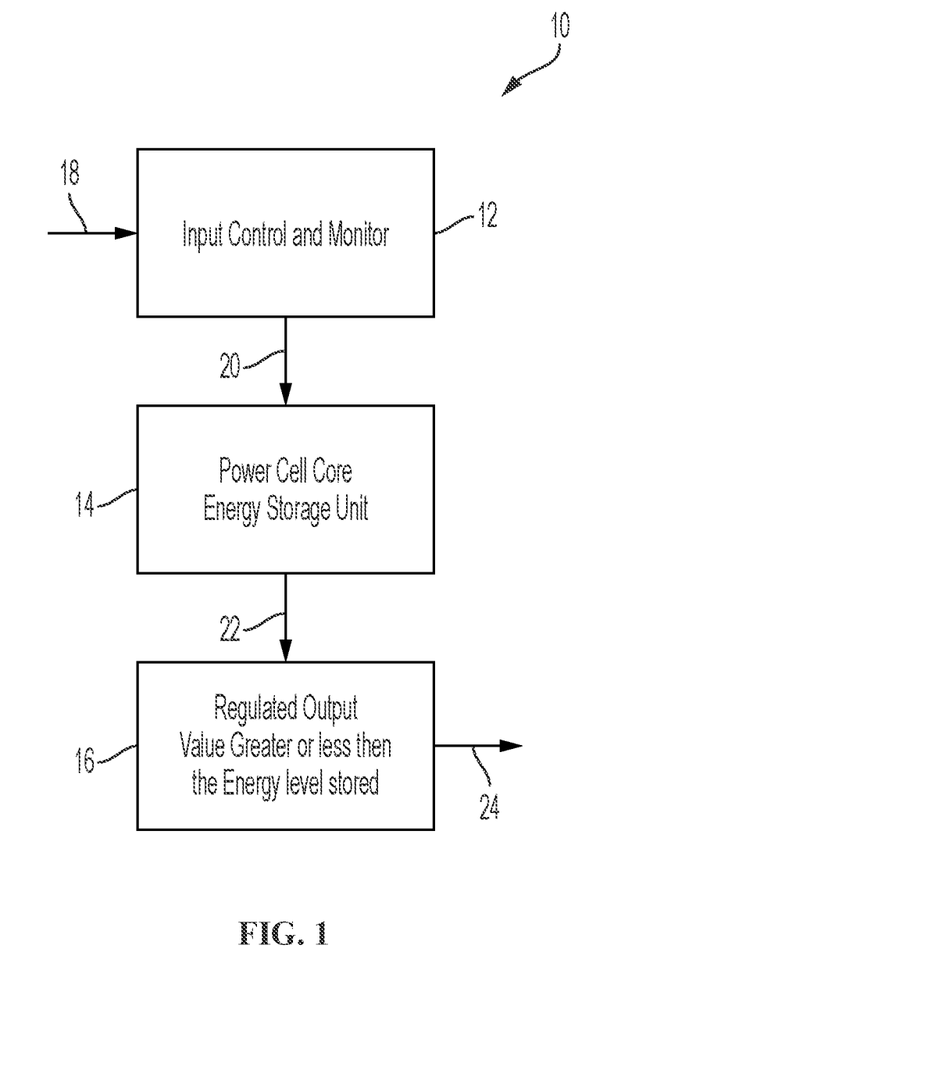
FIG. 1 is a basic block diagram of an energy storage system according to the present invention.

Referring to FIG. 1, an energy storage system 10 according to the present Invention includes an input control and monitor system 12, an energy storage unit 14 and an output regulator system 16. The input control and monitor system 1S receives electrical power from a power source 18 and provides DC electrical energy via a charging input 20 to the energy storage unit 14 for charging an array of storage capacitors. The power source can be of any type, including solar, wind, water, motion, thermal, or electrical power; provided that the power is converted to electrical power for input to the input control and monitor system 12 sufficient to deliver current to charge the storage capacitor array. In some embodiments, the energy storage unit 14 includes a balance control circuit that maintains an equal voltage on each of the storage capacitors in the array to avoid overvoltage damage to them. The energy storage unit 14 provides DC electrical energy via a storage output 22 to the output regulator system 16, which acts as a power supply for providing regulated power to an electrical load via a regulated power output 24. In some embodiments, the output regulator system 16 can be configured to provide regulated DC output power at a voltage greater than the voltage of the storage unit output 22. In other embodiments, the output regulator system 16 can be configured to provide regulated DC output power at a voltage that is less than the voltage of the storage unit output 22. In still other embodiments, the output regulator system 16 can be configured to convert the DC output power from the energy storage unit 14 to regulated AC output power.

Figure 2:
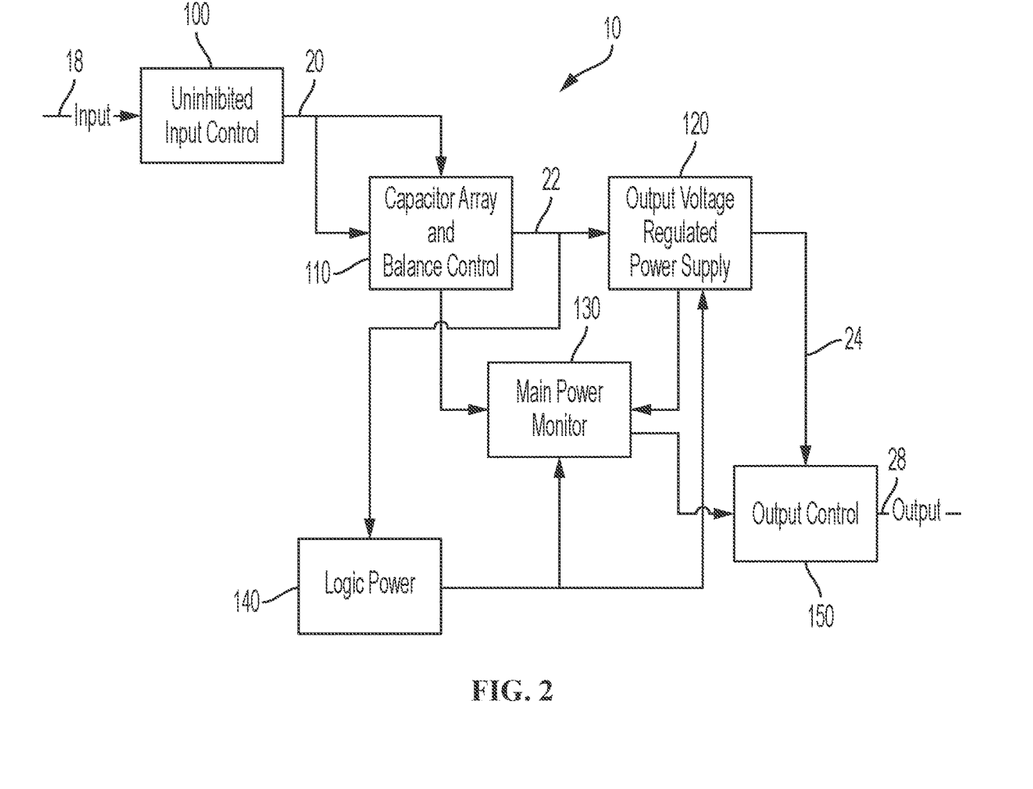
FIG. 2 is a more detailed block diagram of one example of the system of FIG. 1 which includes a storage capacitor array according to the present invention.
Figure 3A:
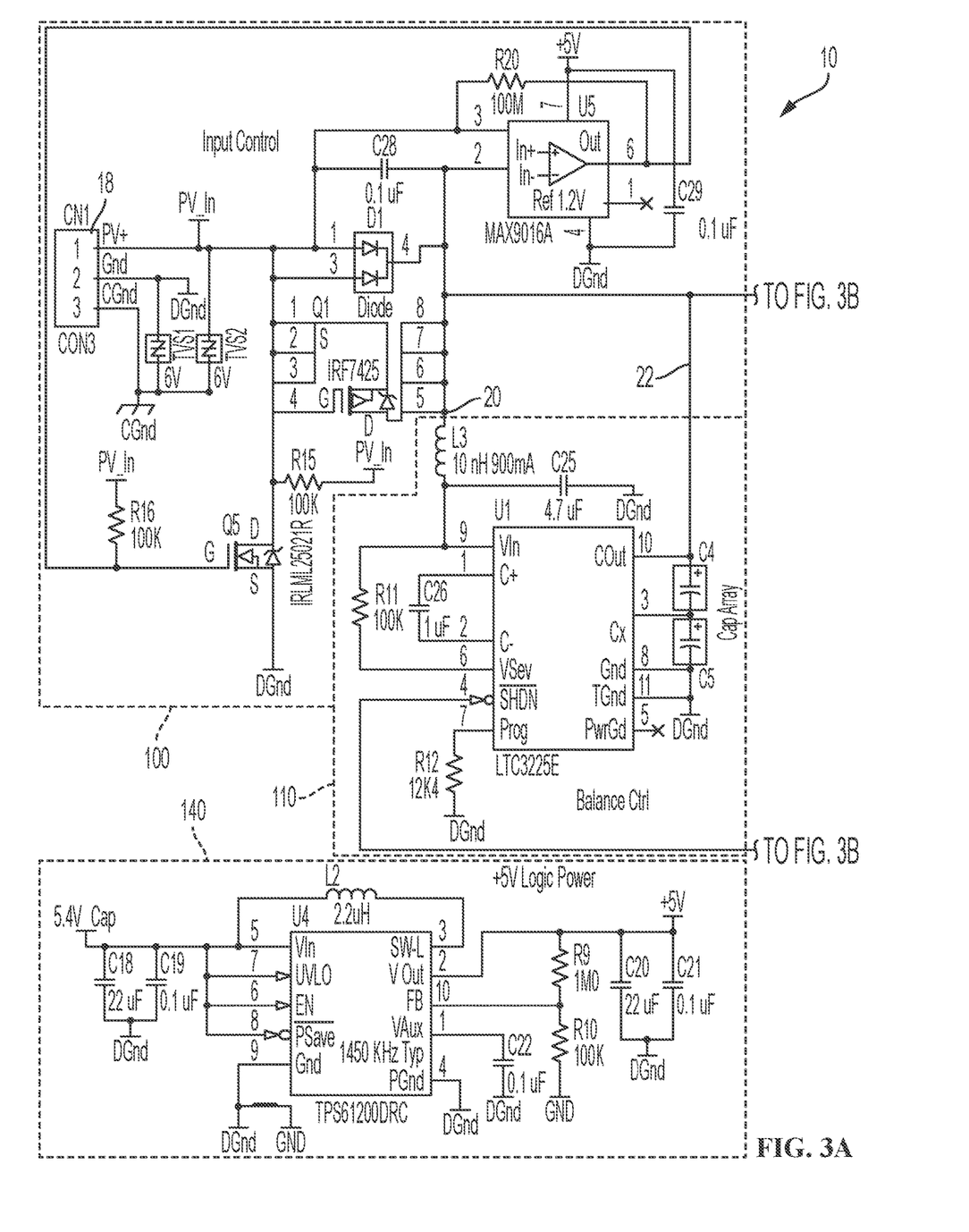
FIGS. 3A through 3C are a schematic diagram of one embodiment of the system of FIG. 2.
Figure 3B:
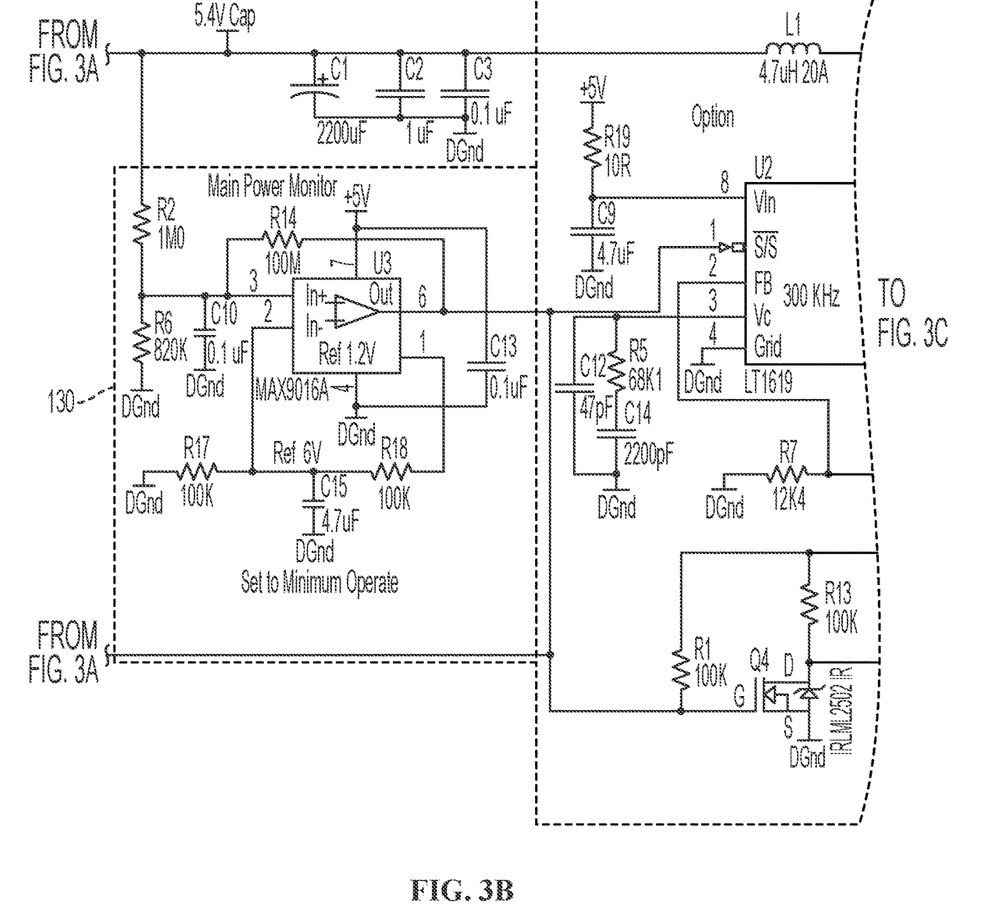
Figure 3C:
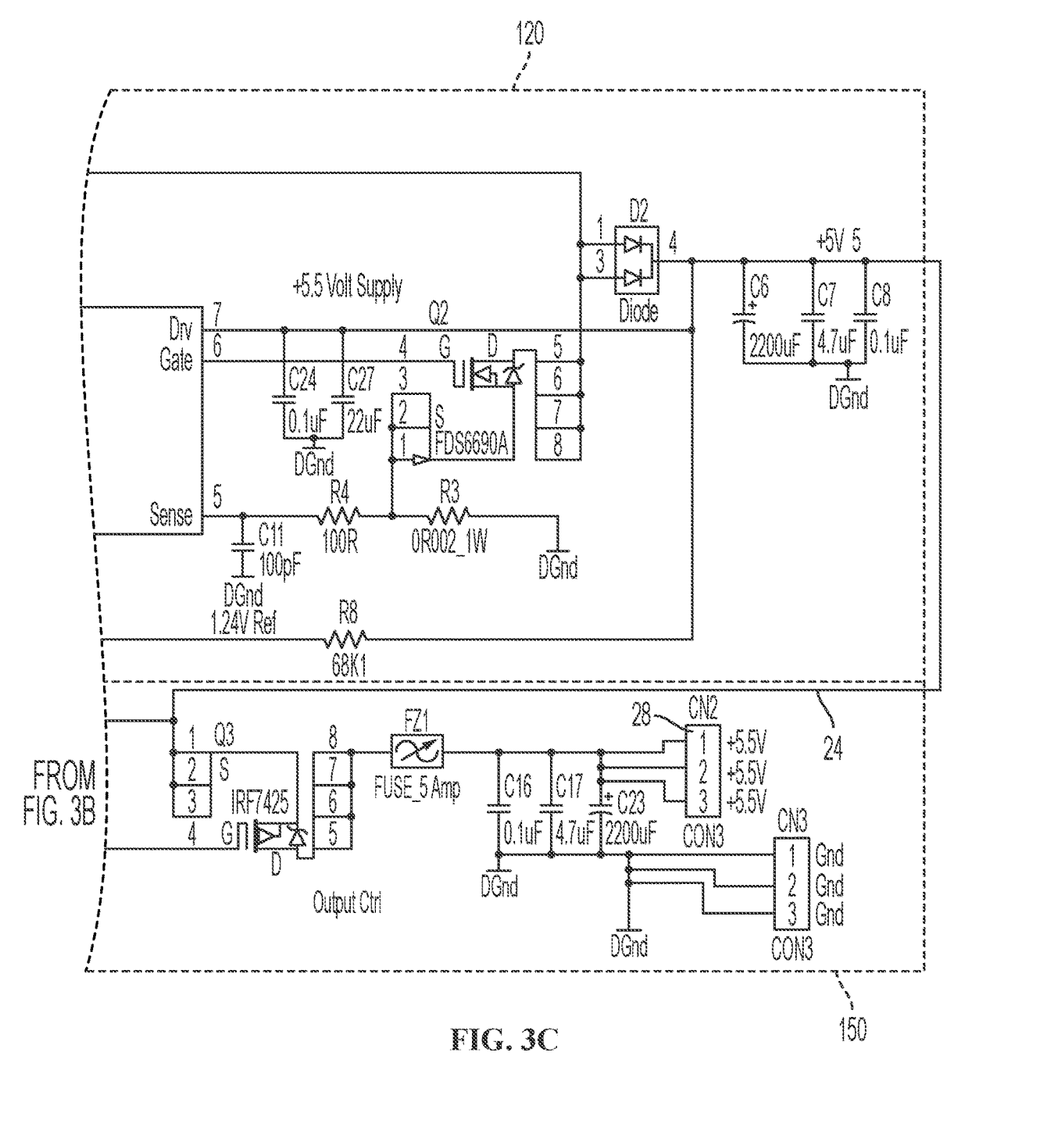

FIG. 2 is a more detailed block diagram of one example of the system of FIG. 1, and FIG. 3 is a schematic diagram of one exemplary embodiment of the system of FIG. 2 for powering a lighting system. As shown in FIGS. 2 and 3, in some embodiments the input control and monitor system 12 can include an input control circuit 100 configured to operate with a DC power source that can fluctuate, such as a solar panel or a source powered by wind. For example, in the embodiment of FIG. 3, the input control circuit 100 includes a voltage comparator US that operates with the circuit to manage the charging of the energy storage unit 14 by isolating the power source input from the storage capacitor array C4, C5 when the solar panel voltage falls below the voltage of the storage capacitor array (shown as S.4V Cap in FIG. 3). In this way, the input control circuit prevents the storage capacitor array C4, C5 from discharging when the power source input voltage is too low. Also, the input control circuit can operate to isolate the power source input from a storage capacitor array C4, C5 when the energy storage unit 14 is charged to its maximum capacity to prevent overcharging. The energy storage unit 14 includes a programmable supercapacitor charger U1 and a storage capacitor array that includes series-connected capacitors C4, C5. The supercapacitor charger U1 maintains an equal voltage on each of the storage capacitors C4, C5 to avoid overvoltage damage to them. In the exemplary capacitor array and balance control circuit 110 shown in FIG. 3, the supercapacitor charger U1 is a 150 mA programmable supercapacitor charger designed to charge two supercapacitors in series to a fixed output voltage (4.8V/5.3V selectable) from a 2.8V/3V to 5.5V input supply with automatic cell balancing to prevent overvoltage damage to either of the capacitors C4, C5. It will be understood that each of the storage capacitors C4, C5 can be single capacitor or multiple capacitors connected in parallel to provide the desired storage capacity. In the embodiment of FIG. 3, each capacitor C4, C5 has a capacitance of 3,000 farads and a DC rated voltage of 2.7 volts. The capacitors C4, C5 are electrically connected in series, giving the capacitor array a total maximum rated voltage of 5.4 volts.

Still referring to FIGS. 2 and 3, the output regulator system 16 includes a main power supply 120 that converts the voltage of the storage unit output 22 (i.e., the total voltage across the storage capacitor array C4, C5) to a regulated power output for providing power to the electric load at the required voltage. For example, in the embodiment shown in FIG. 3, the main power supply 120 is implemented using a fixed frequency PWM controller U2 in a circuit configured to operate as a current mode DC/DC converter providing an output voltage of five volts. The storage unit output 22 also is coupled to the input of a main power monitor circuit 130, which turns off the input to the main power supply 120 when the voltage of the storage unit output 22 (i.e., the total voltage across the storage capacitor array C4, C5) falls below a minimum level determined by the configuration of the main power monitor circuit 130. For example, in the embodiment of FIG. 3, the main power monitor circuit 130 includes a voltage comparator U3, and is operative to electrically decouple the storage capacitor array C4, C5 from the main power supply 120 (and therefore from the electric load) when the voltage of the storage unit output 22 falls to a minimum voltage that is slightly above the reference voltage of 1.24 V. The main power supply output 24 is coupled to an output control circuit 150, which is configured to isolate the main power supply 120 from the electrical load when the voltage of the main power supply output 24 falls below a defined level. In this way, the output control circuit prevents the storage capacitor array C4, C5 from discharging to undesirably low levels, such as levels that would render the logic power supply 140 (described below) inoperable to power the system logic.

Still referring to FIGS. 2 and 3, the storage output 22 also is coupled to the input of a logic power supply 140, which is a low-current power supply that is powered by the capacitor array C4, C5. The logic power supply 140 converts the capacitor array voltage to DC voltage for operating the logic circuitry of the system 10. In the embodiment of FIG. 3, the logic power supply 140 is implemented using a low input voltage synchronous boost converter U4 in a circuit configured to operate as a current mode DC/DC converter that can convert an input of 0.3-S.S volts to a S-volt DC output. The logic power supply 140 remains on and powers the system logic so long as there is sufficient charge in the capacitor array to provide a minimum input voltage for the boost converter U4 to operate.

Storage Unit Capacitor Array

In some embodiments, the capacitors C4, C5 are "supercapacitors" (also called "ultra-capacitors"), which have higher capacitance and can store a larger electric charge than conventional capacitors. Supercapacitors are further advantageous because they can be charged and discharged significantly more times than traditional lead-acid batteries, and can also absorb energy more rapidly without degrading their expected lifetime. For example, some supercapacitors can have up to 1 million charge/discharge cycles; with such capacitors, the system 10 can operate normally for longer periods than traditional batteries without the need for replacement, thereby providing a cost savings for the end user. Each capacitor can be recharged or topped off very quickly using grid-supplied power, in 30 minutes or less, unlike traditional batteries (lead acid or lithium), which require hours on the charger. The capacitor voltage (and stored charge) can be drawn down more than the maximum advisable drawdown amount for traditional types of batteries.

Exemplary Applications

A power storage system according to the present invention can be used for numerous energy storage and delivery applications, some examples of which are described below.

Lighting System. One exemplary application is a lighting system that can provide off-grid lighting solutions for a wide variety of applications that require lighting in remote locations where access to grid power is not available or to simply reduce the power grid Requirements for lighting homes, buildings, etc. The lighting system can include a solar panel for charging the energy storage system 10, which powers one or more LED lighting units. The energy storage system can be recharged via the sun and the storage capacitor array can be depleted as many times as desired with no impact on the power output rating of the unit. In some exemplary embodiments, the lighting system can utilize solar panels rated at 8-50 watt/hr., as appropriate for the application, and the energy storage system 10 can provide up to 180 watts of power at 12 volts for short periods of time or low wattage for much longer periods. The storage capacitor array can be recharged over 1 million times and provide the same level of power for each cycle. Depending upon the load and with sufficient sunlight, the energy storage system 10 is not limited to only charging, but also can drive additional equipment from the output while providing sufficient power to top off the storage capacitor array by the end of the day.

In some embodiments, the lighting system can utilize a panel tracker to manage the position of the solar panel for tracking the sun and maximizing the panel's efficiency. The panel tracker can be a self-powered, a self-contained unit that draws its power directly from the solar panel. To insure tracking capability, the panel tracker can have its own power storage system (of the type designed herein) to maintain its own power storage separate from the power storage system used to power the lights. In this configuration, if the lighting power storage system is depleted, the panel tracker power storage system is unaffected. The panel tracker can recharge itself from the solar panel each day. The panel tracker power requirement is low and will require only a few minutes of charge time to replenish its power stores to fulfill its task of tracking the sun.

To provide indoor lighting, the energy storage system 10 can be positioned remotely from the light and the light can be designed to be switched on and off or dimmed by the user.

Since the lighting energy storage system is harvesting energy from the sun during the day it is ready to release its energy throughout the evening to provide light. Light sensors can be utilized with the LED lighting to illuminate only when needed. A moonlight feature can be set to illuminate dimly reduce stored energy usage as well as light pollution. Photo infrared detectors (PIR) can be used to sense infrared emitting objects—such as humans—and control the on time and intensity of the light when a person is present. An additional advantage of this approach is that would-be criminals can be identified by the rising of the light Levels. For example, in a parking lot the rising light levels can highlight the location and direction of a would-be intruder.

Golf Car. A power storage system according to the present invention can be used to provide an improved golf car to achieve a new level of battery performance and re-chargeability. Current technology offers little to solve battery recharging issues in golf cars or small utility vehicles. Using the power storage feature of the present invention and off grid power to recharge it, golf courses can eliminate the costly overhead of extra cars and charge downtime. In the time it takes for a golfer to exit a car and get his or her clubs, the power cell can be recharged and ready for the next round of golf. In one embodiment, a solar panel could charge the capacitor array during a golfer's use of the car, thereby improving the overall range of the car.

From the foregoing, it can be seen that the energy storage system of the present invention possesses numerous advantages. Because it uses a storage capacitor array rather than battery technology, the system can have a far greater number of charge/discharge cycles than previously known battery storage systems and reduces toxic disposal issues associated with batteries. The system can utilize input energy with a wide range of input voltages at a charging rate limited only by the energy input source and the circuitry for charging the storage capacitor array. The system can be configured to operate with a different power source medium while maintaining proper charging input to the energy storage unit for system operation. The system can store any amount of energy only restricted by the storage capacitor array size, which can be easily increased. By using a power supply or converter capable of making use of the energy stored on the capacitor array, the system can operate at voltages that can be greater or less than the output voltage required by the load being powered and can be configured to provide regulated AC or DC power to the load. The storage capacity of the system can be expanded by increasing the number of storage capacitors in an array. The system can accept input at any rate and automatically terminate the input when the storage unit is fully charged. By using a balance control device, the system can utilize large storage capacitors connected in series and balance the voltages on those capacitors to prevent damage to them.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. An energy storage system for storing potential energy and providing a regulated output of electrical energy for powering an electrical load, the system comprising:
   a power source input configured to provide an input voltage;
   an array of storage capacitors including a plurality of storage capacitors coupled in series coupled to the power source input;
   a balance control device coupled to the array of storage capacitors, operative to balance a voltage on each of the storage capacitors in the array;
   an input control device adapted to receive the input voltage from the power source input, wherein the input control device is operative to:

charge the array of storage capacitors with the input voltage;

isolate the power source input from the array of plurality of storage capacitors coupled in series when the input voltage from the power source input falls below a total voltage of the array of storage capacitors; and isolate the power source input from the array of storage capacitors when the input voltage from the power source input is above a maximum total voltage of the of the array of storage capacitors;

an output power supply device having an input coupled to the array of storage capacitors and operative to provide regulated power to an electrical load; and a power monitor device operative to electrically decouple the array of plurality of storage capacitors coupled in series from the electrical load when the total voltage of the array of storage capacitors falls below a preset minimum level.

2. The energy storage system of claim 1 wherein the output power supply is configured to provide regulated DC output power at a voltage greater than the total voltage of the array of storage capacitors.

3. The energy storage system of claim 1 wherein the output power supply is configured to provide regulated DC output power at a voltage that is less than the total voltage of the array of storage capacitors.

4. The energy storage system of claim 1 wherein the output power supply is operative to convert DC power from the array of storage capacitors to regulated AC output power.

* * * * *